United States Patent
Zhu

(10) Patent No.: US 8,450,442 B2
(45) Date of Patent: May 28, 2013

(54) BOROSILOXANE COMPOSITION, BOROSILOXANE ADHESIVE, COATED AND LAMINATED SUBSTRATES

(75) Inventor: Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 494 days.

(21) Appl. No.: 12/918,343

(22) PCT Filed: Feb. 23, 2009

(86) PCT No.: PCT/US2009/034828
§ 371 (c)(1),
(2), (4) Date: Aug. 19, 2010

(87) PCT Pub. No.: WO2009/111193
PCT Pub. Date: Sep. 11, 2009

(65) Prior Publication Data
US 2010/0316876 A1    Dec. 16, 2010

Related U.S. Application Data

(60) Provisional application No. 61/033,444, filed on Mar. 4, 2008.

(51) Int. Cl.
*C08G 79/08* (2006.01)

(52) U.S. Cl.
USPC .......... 528/5; 528/4; 528/31; 528/32; 528/10; 528/13; 525/478; 525/389; 524/861; 524/588; 428/343; 428/354; 428/355 R; 428/411.1; 428/704; 428/427

(58) Field of Classification Search
None
See application file for complete search history.

(56) References Cited

U.S. PATENT DOCUMENTS

| | | | |
|---|---|---|---|
| 2,684,349 | A | 12/1952 | Whelton et al. |
| 3,419,593 | A | 12/1968 | Willing et al. |
| 3,615,272 | A | 10/1971 | Collins et al. |
| 3,640,837 | A | 2/1972 | Gaeth et al. |
| 4,087,585 | A | 5/1978 | Schulz |
| 4,152,509 | A * | 5/1979 | Yajima et al. ............ 528/4 |
| 4,260,780 | A | 4/1981 | West |
| 4,276,424 | A | 6/1981 | Peterson, Jr. et al. |
| 4,314,956 | A | 2/1982 | Baney et al. |
| 4,324,901 | A | 4/1982 | West et al. |
| 4,510,094 | A | 4/1985 | Drahnak |

(Continued)

FOREIGN PATENT DOCUMENTS
WO  WO 2005/115746 A1  12/2005

OTHER PUBLICATIONS

Atsushi, et. al., "Electric Insulation Wire", JP 04-190509, Jul. 8, 1992, . Abstract only.

(Continued)

*Primary Examiner* — Alicia Chevalier
*Assistant Examiner* — Anish Desai
(74) *Attorney, Agent, or Firm* — Howard & Howard Attorneys PLLC

(57) ABSTRACT

A borosiloxane composition comprising a borosiloxane having an average of at least two alkenyl groups per molecule, an organosilicon compound having an average of at least two silicon-bonded hydrogen atoms per molecule, and a hydrosilylation catalyst; a borosiloxane adhesive comprising a cured product of at least one borosiloxane; and a coated substrate and a laminated substrate, each comprising the borosiloxane adhesive.

15 Claims, 1 Drawing Sheet

U.S. PATENT DOCUMENTS

| | | |
|---|---|---|
| 4,530,879 A | 7/1985 | Drahnak |
| 4,568,566 A | 2/1986 | Tolentino et al. |
| 4,766,176 A | 8/1988 | Lee et al. |
| 4,841,006 A | 6/1989 | Kobayashi et al. |
| 4,999,397 A | 3/1991 | Weiss et al. |
| 5,010,159 A | 4/1991 | Bank et al. |
| 5,017,654 A | 5/1991 | Togashi et al. |
| 5,063,267 A | 11/1991 | Hanneman et al. |
| 5,112,779 A | 5/1992 | Burns et al. |
| 5,194,649 A | 3/1993 | Okawa |
| 5,283,309 A | 2/1994 | Morita |
| 5,310,843 A | 5/1994 | Morita |
| 5,340,898 A | 8/1994 | Cavezzan et al. |
| 5,358,983 A | 10/1994 | Morita |
| 5,468,826 A | 11/1995 | Gentle et al. |
| 5,468,827 A | 11/1995 | Morita et al. |
| 5,486,588 A | 1/1996 | Morita |
| 5,496,961 A | 3/1996 | Dauth et al. |
| 5,530,075 A | 6/1996 | Morita et al. |
| 5,565,273 A | 10/1996 | Egli et al. |
| 5,716,424 A | 2/1998 | Mennig et al. |
| 5,738,976 A | 4/1998 | Okinoshima et al. |
| 5,824,761 A | 10/1998 | Bujanowski et al. |
| 5,861,467 A | 1/1999 | Bujanowski et al. |
| 5,880,194 A | 3/1999 | Alvarez et al. |
| 5,959,038 A | 9/1999 | Furukawa et al. |
| 6,159,606 A | 12/2000 | Gelderie et al. |
| 6,180,809 B1 * | 1/2001 | Pillot et al. .................... 556/402 |
| 6,509,423 B1 | 1/2003 | Zhu |
| 6,623,864 B1 | 9/2003 | Sweet et al. |
| 6,831,145 B2 | 12/2004 | Kleyer et al. |
| 7,687,587 B2 | 3/2010 | Smith et al. |
| 2003/0235383 A1 | 12/2003 | Gardner et al. |
| 2004/0071960 A1 | 4/2004 | Weber et al. |
| 2004/0214015 A1 | 10/2004 | Asai et al. |
| 2006/0155039 A1 | 7/2006 | Alexander et al. |
| 2006/0204765 A1 | 9/2006 | Scheim et al. |
| 2007/0111014 A1 | 5/2007 | Katsoulis et al. |
| 2007/0122631 A1 | 5/2007 | Higuchi et al. |
| 2007/0178292 A1 | 8/2007 | Hasegawa et al. |
| 2007/0267215 A1 | 11/2007 | Dernovsek et al. |
| 2008/0051548 A1 | 2/2008 | Bailey et al. |
| 2008/0138525 A1 | 6/2008 | Bailey et al. |
| 2009/0105362 A1 | 4/2009 | Anderson et al. |
| 2009/0155577 A1 | 6/2009 | Anderson et al. |
| 2010/0188766 A1 | 7/2010 | Harimoto et al. |

OTHER PUBLICATIONS

Yoshimi, et. al., "Refractory Laminated Glass", JP 07-206482, Aug. 8, 1995. Abstract only.

Motoharu, et. al., "Refractory Laminated Glass", JP 08-067538. Abstract only, Mar. 12, 1996.

Kasuhiro, et. al., "Flame-Retardant Resin Composition," JP 09-020867. Abstract only, Jan. 21, 1997.

Asahito, et. al., "Fire Protective Laminted Glass Plate," JP 2002-293585. Abstract only, Oct. 9, 2002.

Shoichiro, et. al. "Silicone Resin Composition and Low-Voltage Fire-Resistant Cable Using the Same," JP 2003-246928. Abstract only, Sep. 5, 2003.

Weber, et. al. "Thin Glass-Polymer Systems as Flexible Substrates for Displays," SID 02 Digest, 2002, pp. 53-55.

Reese, et. al., "Development of Silicone Substrates to be Used with CIGS Deposition," United States Airforce, 2005.

Guo, et. al., "Highly Active Visible-Light Photocatalysts for Curing a Ceramic Precursor," Chemical Materials, 1998, vol. 10, pp. 531-536.

\* cited by examiner

US 8,450,442 B2

BOROSILOXANE COMPOSITION, BOROSILOXANE ADHESIVE, COATED AND LAMINATED SUBSTRATES

CROSS REFERENCE TO RELATED APPLICATIONS

This application is a U.S. national stage filing under 35 U.S.C. §371 of PCT Application No. PCT/US09/034,828 filed on 23 Feb. 2009, currently pending, which claims the benefit of U.S. Provisional Patent Application No. 61/033,444 filed 4 Mar. 2008 under 35 U.S.C. §119 (e). PCT Application No. PCT/US09/034,828 and U.S. Provisional Patent Application No. 61/033,444 are hereby incorporated by reference.

FIELD OF THE INVENTION

The present invention relates to a borosiloxane composition and more particularly to a borosiloxane composition comprising a borosiloxane having an average of at least two alkenyl groups per molecule, an organosilicon compound having an average of at least two silicon-bonded hydrogen atoms per molecule, and a hydrosilylation catalyst. The present invention also relates to a borosiloxane adhesive comprising a cured product of at least one borosiloxane. The present invention further relates to a coated substrate and to a laminated substrate, each comprising the borosiloxane adhesive.

BACKGROUND OF THE INVENTION

Silicone adhesives are useful in a variety of applications by virtue of their unique combination of properties, including high thermal stability, good moisture resistance, excellent flexibility, high ionic purity, low alpha particle emissions, and good adhesion to various substrates. For example, silicone adhesives are widely used in the automotive, electronic, construction, appliance, and aerospace industries.

However, when conventional silicone adhesives are exposed to high temperatures, for example temperatures encountered by direct contact with an open flame, the adhesives decompose to form a char, typically a nonadherent powder.

In view of the foregoing, there is a need for a silicone-containing composition that cures to form an adhesive having high char yield, and high adhesion during and after exposure to temperatures above the decomposition temperature of the adhesive.

SUMMARY OF THE INVENTION

The present invention is directed to a borosiloxane composition, comprising:
(A) a borosiloxane selected from (i) at least one polyborosiloxane having the formula $(R^1_2BO_{1/2})_l$ $[(BO_{(3-v)/2})(OH)_v]_m[R^1BO_{(2-w)/2})(OH)_w]_n(R^1_3SiO_{1/2})_p$ $[(R^1_2SiO_{(2-x)/2})(OH)_x]_q[(R^1SiO_{(3-y)/2})(OH)_y]_r[(SiO_{(4-z)/2})(OH)_z]_s$ (I), (ii) at least one borosiloxane compound having the formula $R^1_aB(OSiR^1_3)_{3-a}$ (II), and (iii) a mixture comprising (A)(i) and (A)(ii), wherein each $R^1$ is independently $C_1$ to $C_{10}$ hydrocarbyl or $C_1$ to $C_{10}$ halogen-substituted hydrocarbyl, l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, l+m+n+p+q+r+s≈1, and a is 0, 1, or 2, provided the borosiloxane has an average of at least two alkenyl groups per molecule;
(B) an organosilicon compound having an average of at least two silicon-bonded hydrogen atoms per molecule in an amount sufficient to cure the borosiloxane; and
(C) a hydrosilylation catalyst.

The present invention is also directed to a borosiloxane adhesive comprising a cured product of a borosiloxane, wherein the borosiloxane is selected from at least one polyborosiloxane having the formula $(R^1_2BO_{1/2})_l[(BO_{(3-v)/2})(OH)_v]_m[R^1BO_{(2-w)/2})(OH)_w]_n(R^1_3SiO_{1/2})_p[(R^1_2SiO_{(2-x)/2})(OH)_x]_q[(R^1SiO_{(3-y)/2})(OH)_y]_r[(SiO_{(4-z)/2})(OH)_z]_s$ (I), at least one borosiloxane compound having the formula $R^1_aB(OSiR^1_3)_{3-a}$ (II), provided the borosiloxane compound has an average of at least two alkenyl groups per molecule, and a mixture comprising at least one polyborosiloxane having the formula (I), and at least one borosiloxane compound having the formula (II), provided the polyborosiloxane and the borosiloxane compound in the mixture each have an average of at least two alkenyl groups per molecule, wherein each $R^1$ is independently $C_1$ to $C_{10}$ hydrocarbyl or $C_1$ to $C_{10}$ halogen-substituted hydrocarbyl; l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, l+m+n+p+q+r+s≈1, and a is 0, 1, or 2.

The present invention is further directed to a coated substrate, comprising:
a substrate; and
a borosiloxane adhesive coating on at least a portion of a surface of the substrate, wherein the adhesive coating comprises a cured product of a borosiloxane, the cured product as described above.

The present invention is still further directed to a laminated substrate, comprising:
a first substrate;
at least one additional substrate overlying the first substrate; and
a borosiloxane adhesive coating on at least a portion of at least one surface of each substrate, provided at least a portion of the adhesive coating is between and in direct contact with opposing surfaces of adjacent substrates, wherein the adhesive coating comprises a cured product of a borosiloxane, the cured product as described above.

The borosiloxane adhesive of the present invention has high resistance to moisture, high transparency, and excellent adhesion to various substrates. Moreover, the borosiloxane adhesive has high adhesion during and after exposure to temperatures above the decomposition temperature of the adhesive, low flammability (as evidenced by low heat release rate), and high char yield.

The borosiloxane adhesive of the present invention is useful in applications requiring adhesives having high moisture resistance, high adhesion at elevated temperatures, low flammability, and high transparency. For example, the adhesive is useful for bonding glass panels in the fabrication of fire rated windows and glass firewalls.

These and other features, aspects, and advantages of the present invention will become better understood with reference to the following description, appended claims, and accompanying drawings.

DETAILED DESCRIPTION OF THE INVENTION

Figure 1:
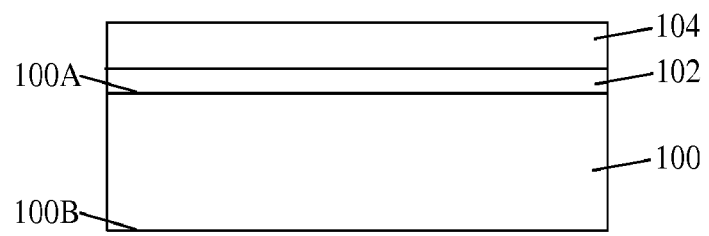
FIG. 1 shows a cross-sectional view of one embodiment of a laminated substrate according to the present invention.

As used herein, the notation $(BO_{(3-v)/2})(OH)_v$, and $(R^1BO_{(2-w)/2})(OH)_w$ denote the average formulae of units having boron bonded to three oxygen atoms and two oxygen atoms, respectively, where each oxygen atom is also bonded to another atom, namely, Si or H. For example, a single unit having the formula $(BO_{(3-v)/2})(OH)_v$ wherein v=0, can be represented by the structural formula:

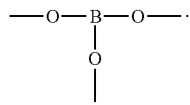

Similarly, a single unit having the formula $(R^1BO_{(2-w)/2})(OH)_w$ wherein $R^1$ is $C_1$ to $C_{10}$ hydrocarbyl or $C_1$ to $C_{10}$ halogen-substituted hydrocarbyl and w=0, can be represented by the structural formula:

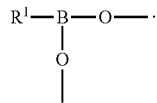

Furthermore, a unit having the formula $R^1{}_2BO_{1/2}$, wherein each $R^1$ is independently $C_1$ to $C_{10}$ hydrocarbyl or $C_1$ to $C_{10}$ halogen-substituted hydrocarbyl, has the formula:

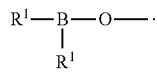

In each of the preceding formulas, the line segments attached to oxygen atoms represent free valences, i.e., points of attachment to other atoms.

A borosiloxane composition according to the present invention comprises:
(A) a borosiloxane selected from (i) at least one polyborosiloxane having the formula $(R^1{}_2BO_{1/2})_l$ $[(BO_{(3-v)/2})(OH)_v]_m[(R^1BO_{(2-w)/2})(OH)_w]_n(R^1{}_3SiO_{1/2})_p$ $[(R^1{}_2SiO_{(2-x)/2})(OH)_x]_q[(R^1SiO_{(3-y)/2})(OH)_y]_r[(SiO_{(4-z)/2})(OH)_z]_s$ (I), (ii) at least one borosiloxane compound having the formula $R^1{}_aB(OSiR^1{}_3)_{3-a}$ (II), and (iii) a mixture comprising (A)(i) and (A)(ii), wherein each $R^1$ is independently $C_1$ to $C_{10}$ hydrocarbyl or $C_1$ to $C_{10}$ halogen-substituted hydrocarbyl, l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, l+m+n+p+q+r+s≈1, and a is 0, 1, or 2, provided the borosiloxane has an average of at least two alkenyl groups per molecule;
(B) an organosilicon compound having an average of at least two silicon-bonded hydrogen atoms per molecule in an amount sufficient to cure the borosiloxane; and
(C) a hydrosilylation catalyst.

Component (A) is a borosiloxane selected from (i) at least one polyborosiloxane having the formula $(R^1{}_2BO_{1/2})_l[(BO_{(3-v)/2})(OH)_v]_m[(R^1BO_{(2-w)/2})(OH)_w]_n$ $(R^1{}_3SiO_{1/2})_p[(R^1{}_2SiO_{(2-x)/2})(OH)_x]_q[(R^1SiO_{(3-y)/2})(OH)_y]_r$ $[(SiO_{(4-z)/2})(OH)_z]_s$ (I), (ii) at least one borosiloxane compound having the formula $R^1{}_aB(OSiR^1{}_3)_{3-a}$ (II), and (iii) a mixture comprising (A)(i) and (A)(ii), wherein each $R^1$ is independently $C_1$ to $C_{10}$ hydrocarbyl or $C_1$ to $C_{10}$ halogen-substituted hydrocarbyl, l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, l+m+n+p+q+r+s≈1, and a is 0, 1, or 2, provided the borosiloxane has an average of at least two alkenyl groups per molecule.

Borosiloxane (A)(i) is at least one polyborosiloxane having the formula $(R^1{}_2BO_{1/2})_l[(BO_{(3-v)/2})(OH)_v]_m$ $[(R^1BO_{(2-w)/2})(OH)_w]_n(R^1{}_3SiO_{1/2})_p[(R^1{}_2SiO_{(2-x)/2})(OH)_x]_q$ $[(R^1SiO_{(3-y)/2})(OH)_y]_r[(SiO_{(4-z)/2})(OH)_z]_s$ (I), wherein each $R^1$ is independently $C_1$ to $C_{10}$ hydrocarbyl or $C_1$ to $C_{10}$ halogen-substituted hydrocarbyl, l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, and l+m+n+p+q+r+s≈1, provided the polyborosiloxane has an average of at least two alkenyl groups per molecule.

The polyborosiloxane contains units having the formula $[(BO_{(3-v)/2})(OH)_v]$ and/or units having the formula $[(R^1BO_{(2-w)/2})(OH)_w]$ in combination with at least one of the following: units having the formula $[(R^1{}_2SiO_{(2-x)/2})(OH)_x]$, units having the formula $[(R^1SiO_{(3-y)/2})(OH)_y]$, and units having the formula $[(SiO_{(4-z)/2})(OH)_z]$, wherein $R^1$, v, w, x, y, and z are as defined and exemplified below.

The hydrocarbyl and halogen-substituted hydrocarbyl groups represented by $R^1$ typically have from 1 to 10 carbon atoms, alternatively from 1 to 6 carbon atoms, alternatively from 1 to 4 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, and propenyl, butenyl, hexenyl, and octenyl; arylalkenyl, such as styryl and cinnamyl; and alkynyl, such as ethynyl and propynyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

In one embodiment, the hydrocarbyl groups represented by $R^1$ in the formula (I) of the polyborosiloxane are not phenyl.

In the formula (I) of the polyborosiloxane, the subscripts l, m, n, p, q, r, and s are mole fractions. The subscript l typically has a value of from 0 to 0.2, alternatively from 0 to 0.1, alternatively from 0 to 0.05; the subscript m typically has a value of from 0 to 0.5, alternatively from 0.1 to 0.4, alternatively from 0.15 to 0.3; the subscript n typically has a value of from 0 to 0.6, alternatively from 0 to 0.4, alternatively from 0.1 to 0.2; the subscript p typically has a value of from 0 to 0.7, alternatively from 0 to 0.5, alternatively from 0 to 0.2; the subscript q typically has a value of from 0 to 0.9, alternatively from 0 to 0.7, alternatively from 0 to 0.5; the subscript r typically has a value of from 0 to 0.999, alternatively from 0 to 0.8, alternatively from 0.1 to 0.4; and the subscript s typically has a value of from 0 to 0.5, alternatively from 0 to 0.35, alternatively from 0.05 to 0.2. Also, the sum m+n is typically from 0.001 to 0.58, alternatively from 0.01 to 0.4, alternatively from 0.1 to 0.3; the sum q+r+s is typically from 0.42 to 0.999, alternatively from 0.45 to 0.9, alternatively from 0.6 to 0.8; and the ratio (p+2q+3r+4s)/(3m+2n) is typically from 1.01 to 1000, alternatively from 1.2 to 100, alternatively from 1.5 to 10.

Also, in the formula (I) of the polyborosiloxane, the subscripts v, w, x, y and z represent the average numbers of hydroxy groups associated with the various units in the formula. The subscript v typically has a value of from 0 to 0.05, alternatively from 0 to 0.04, alternatively from 0 to 0.03; the subscript w typically has a value of from 0 to 0.05, alternatively from 0.01 to 0.04, alternatively from 0.01 to 0.02; the subscript x typically has a value of from 0 to 0.45, alternatively from 0.01 to 0.35, alternatively from 0.05 to 0.25; the subscript y typically has a value of from 0 to 0.63, alternatively from 0.01 to 0.4, alternatively from 0.05 to 0.25; the subscript z typically has a value of from 0 to 0.25, alternatively from 0.01 to 0.15, alternatively from 0.01 to 0.05.

Furthermore, in the formula (I) of the polyborosiloxane, the sum l+m+n+p+q+r+s≈(is approximately equal to) 1. This means that in addition to units having the average formulas shown in the formula (I) above, the polyborosiloxane may contain residual amounts, e.g., not greater than 5 mol %, of one or more units having the following average formulas: $(BO_{(3-v'/2)})(OR^2)_{v'}$, $(R^1BO_{(2-w'/2)})(OR^2)_{w'}$, $(R^1{}_2SiO_{(2-x'/2)})(X)_{x'}$, $(R^1SiO_{(3-y'/2)})(X)_{y'}$, and $(SiO_{(4-z'/2)})(X)_{z'}$, wherein $R^1$ is as defined and exemplified above, $R^2$ is $C_1$ to $C_8$ alkyl, X is —Cl or —Br, v' has an average value of from 0 to 0.04; w' has an average value of from 0 to 0.02; x' has an average value of from 0 to 0.03; y' has an average value of from 0 to 0.03; and z' has an average value of from 0 to 0.03.

The alkyl groups represented by $R^2$ typically have from 1 to 8 carbon atoms, alternatively from 1 to 6 carbon atoms, alternatively from 1 to 4 carbon atoms. Acyclic alkyl groups containing at least 3 carbon atoms can have a branched or unbranched structure. Examples of alkyl groups represented by $R^2$ include, but are not limited to, methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; and cycloalkyl, such as cyclopentyl, cyclohexyl, and methylcyclohexyl.

The polyborosiloxane has an average of at least two alkenyl groups per molecule. The alkenyl groups, represented by $R^1$ can be bonded to boron atoms, silicon atoms, or both boron and silicon atoms. Typically at least 10 mol %, alternatively at least 25 mol %, alternatively at least 50 mol % of the groups $R^1$ in the polyborosiloxane are alkenyl. As used herein, the term "mol % of the groups $R^1$ in the polyborosiloxane are alkenyl" is defined as the ratio of the number of moles of silicon-bonded and boron-bonded alkenyl groups in the polyborosiloxane to the total number of moles of the groups $R^1$ in the polyborosiloxane, multiplied by 100.

The polyborosiloxane typically has a number-average molecular weight ($M_n$) of from 500 to 1,000,000, alternatively from 500 to 500,000, alternatively 10,000 to 500,000, alternatively from 10,000 to 50,000, where the molecular weight is determined by gel permeation chromatography employing a refractive index detector and silicone resin (MQ) standards.

The polyborosiloxane typically has a viscosity of from 0.5 to 10,000 Pa·s, alternatively from 1 to 1,000 Pa·s, alternatively from 2 to 100 Pa·s, at 25° C.

The polyborosiloxane typically contains less than 20% (w/w), alternatively less than 15% (w/w), alternatively less than 10% (w/w), of silicon-bonded hydroxy groups, as determined by $^{29}Si$ NMR.

Also, the polyborosiloxane typically contains less than 5 mol %, alternatively less than 4 mol %, alternatively less than 3 mol %, of boron-bonded hydroxy groups, where the mol % of boron-bonded hydroxy groups is defined as the ratio of the number of moles of boron-bonded hydroxy groups in the polyborosiloxane to the sum of the number of moles of Si atoms and B atoms in the polyborosiloxane, multiplied by 100. Moreover, the mol % of boron-bonded hydroxy groups can be estimated from the relation: D=vBC/A, where D is mol % of boron-bonded hydroxy groups; v is a proportionality constant, which is assumed to have a value of 1; A is the area of the Si—OH absorption centered at approximately ~3400 cm$^{-1}$ in the FTIR spectrum of the polyborosiloxane; B is the area of the B—OH absorption centered at approximately ~3230 cm$^{-1}$ in the FTIR spectrum of the polyborosiloxane; and C is mol % of silicon-bonded hydroxy groups in the polyborosiloxane, as determined by $^{29}Si$ NMR.

Examples of polyborosiloxanes having the formula (I) include, but are not limited to, polyborosiloxanes having the following formulae:

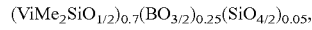
$(ViMe_2SiO_{1/2})_{0.7}(BO_{3/2})_{0.25}(SiO_{4/2})_{0.05}$,

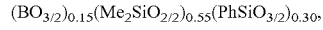
$(BO_{3/2})_{0.15}(Me_2SiO_{2/2})_{0.55}(PhSiO_{3/2})_{0.30}$,

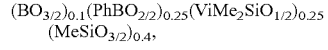
$(BO_{3/2})_{0.1}(PhBO_{2/2})_{0.25}(ViMe_2SiO_{1/2})_{0.25}(MeSiO_{3/2})_{0.4}$,

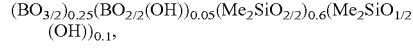
$(BO_{3/2})_{0.25}(BO_{2/2}(OH))_{0.05}(Me_2SiO_{2/2})_{0.6}(Me_2SiO_{1/2}(OH))_{0.1}$,

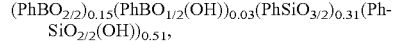
$(PhBO_{2/2})_{0.15}(PhBO_{1/2}(OH))_{0.03}(PhSiO_{3/2})_{0.31}(PhSiO_{2/2}(OH))_{0.51}$,

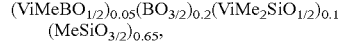
$(ViMeBO_{1/2})_{0.05}(BO_{3/2})_{0.2}(ViMe_2SiO_{1/2})_{0.1}(MeSiO_{3/2})_{0.65}$,

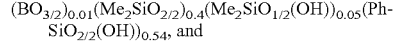
$(BO_{3/2})_{0.01}(Me_2SiO_{2/2})_{0.4}(Me_2SiO_{1/2}(OH))_{0.05}(PhSiO_{2/2}(OH))_{0.54}$, and

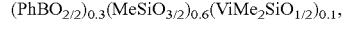
$(PhBO_{2/2})_{0.3}(MeSiO_{3/2})_{0.6}(ViMe_2SiO_{1/2})_{0.1}$, where Me is methyl, Vi is vinyl, Ph is phenyl, and the numerical subscripts outside the parentheses denote mole fractions. Also, in the preceding formulae, the sequence of units is unspecified.

Borosiloxane (A)(i) can be a single polyborosiloxane or a mixture comprising two or more different polyborosiloxanes, each having the formula (I), above, and having an average of at least two alkenyl groups per molecule.

The polyborosiloxane having the formula (I) can be prepared by (I) reacting (a) an alkoxyborane selected from (i) at least one trialkoxyborane having the formula $B(OR^2)_3$, (ii) at least one dialkoxyborane having the formula $R^1B(OR^2)_2$, (iii) a mixture comprising (a)(i) and (a)(ii), and (iv) a mixture comprising a monoalkoxyborane having the formula $R^1{}_2BOR^2$ and at least one of (a)(i) and (a)(ii), with (b) a halosilane selected from (i) at least one trihalosilane having the formula $R^1SiX_3$, (ii) at least one dihalosilane having the formula $R^1{}_2SiX_2$, (iii) at least one tetrahalosilane having the formula $SiX_4$, (iv) a mixture comprising at least two of (b)(i), (b)(ii), and (b)(iii), and (v) a mixture comprising a monohalosilane having the formula $R^1{}_3SiX$ and at least one of (b)(i), (b)(ii), and (b)(iii), in the presence of a Lewis acid catalyst to form a polyborosiloxane intermediate, wherein each $R^1$ is independently $C_1$ to $C_{10}$ hydrocarbyl or $C_1$ to $C_{10}$ halogen-substituted hydrocarbyl, $R^2$ is $C_1$ to $C_8$ alkyl, X is —Cl or —Br, the ratio of the sum of the number of moles of (a)(i) and (a)(ii) to the sum of the number of moles of the alkoxyborane (a) and the halosilane (b) is from 0.001 to 0.58, the ratio of the sum of the number of moles of (b)(i), (b)(ii), and (b)(iii) to the sum of the number of moles of the alkoxyborane (a) and the halosilane (b) is from 0.42 to 0.999, the ratio of the number of moles of the halosilane (b) to the number of moles of the alkoxyborane (a) is from 0.724 to 999, and the ratio of the number of moles of the group —X in the halosilane (b) to the number of moles of the group —$OR^2$ in the alkoxyborane (a) is at least 1.01; (II) reacting the polyborosiloxane intermediate and, optionally, at least one halosilane having the formula $R^1{}_nSiX_{4-n}$, with water to form a water-insoluble hydrolysis product, wherein $R^1$ and X are as defined above and n=0, 1, 2, or 3, provided when an excess amount of water is used, the method further comprises separating the hydrolysis product from the water; and (III) distilling the hydrolysis product to remove water of condensation; provided the polyborosiloxane contains an average of at least two alkenyl groups per molecule.

In step (I) of the method of preparing the polyborosiloxane, (a) an alkoxyborane selected from (i) at least one trialkoxyborane having the formula $B(OR^2)_3$, (ii) at least one dialkoxyborane having the formula $R^1B(OR^2)_2$, (iii) a mixture comprising (a)(i) and (a)(ii), and (iv) a mixture comprising a monoalkoxyborane having the formula $R^1{}_2BOR^2$ and at least one of (a)(i) and (a)(ii), is reacted with (b) a halosilane selected from (i) at least one trihalosilane having the formula $R^1SiX_3$, (ii) at least one dihalosilane having the formula $R^1{}_2SiX_2$, (iii) at least one tetrahalosilane having the formula $SiX_4$, (iv) a mixture comprising at least two of (b)(i), (b)(ii), and (b)(iii), and (v) a mixture comprising a monohalosilane having the formula $R^1{}_3SiX$ and at least one of (b)(i), (b)(ii), and (b)(iii), in the presence of a Lewis acid catalyst to form a polyborosiloxane intermediate, wherein each $R^1$ is independently $C_1$ to $C_{10}$ hydrocarbyl or $C_1$ to $C_{10}$ halogen-substituted hydrocarbyl, $R^2$ is $C_1$ to $C_8$ alkyl, X is —Cl or —Br, the ratio of the sum of the number of moles of (a)(i) and (a)(ii) to the sum of the number of moles of the alkoxyborane (a) and the halosilane (b) is from 0.001 to 0.58, the ratio of the sum of the number of moles of (b)(i), (b)(ii), and (b)(iii) to the sum of the number of moles of the alkoxyborane (a) and the halosilane (b) is from 0.42 to 0.999, the ratio of the number of moles of the halosilane (b) to the number of moles of the alkoxyborane (a) is from 0.724 to 999, and the ratio of the number of moles of the group —X in the halosilane (b) to the number of moles of the group —$OR^2$ in the alkoxyborane (a) is at least 1.01.

Alkoxyborane (a) is selected from (i) at least one trialkoxyborane having the formula $B(OR^2)_3$, (ii) at least one dialkoxyborane having the formula $R^1B(OR^2)_2$, (iii) a mixture comprising (a)(i) and (a)(ii), and (iv) a mixture comprising a monoalkoxyborane having the formula $R^1{}_2BOR^2$ and at least one of (a)(i) and (a)(ii), wherein $R^1$ and $R^2$ are as defined and exemplified above.

Alkoxyborane (a)(i) at least one trialkoxyborane having the formula $B(OR^2)_3$, wherein $R^2$ is as described and exemplified above. Examples of trialkoxyboranes include, but are not limited to, trimethyl borate, triethyl borate, tripropyl borate, tripentyl borate, trihexyl borate, and trioctyl borate.

Alkoxyborane (a)(i) can be a single trialkoxyborane or a mixture comprising two or more different trialkoxyboranes, each having the formula $B(OR^2)_3$ wherein $R^2$ is as defined and exemplified above. Methods of preparing trialkoxyboranes are well known in the art; many of these compounds are commercially available.

Alkoxyborane (a)(ii) is at least one dialkoxyborane having the formula $R^1B(OR^2)_2$, wherein $R^1$ and $R^2$ are as defined and exemplified above. Examples of dialkoxyboranes include, but are not limited to, phenyldimethoxyborane, methyldimethoxyborane, phenyldiethoxyborane, methyldiethoxyborane, and n-butyldimethoxyborane.

Alkoxyborane (a)(ii) can be a single dialkoxyborane or a mixture comprising two or more different dialkoxyboranes, each having the formula $R^1$—$B(OR^2)_2$ wherein $R^1$ and $R^2$ are as defined and exemplified above. Methods of preparing dialkoxyboranes are well known in the art; many of these compounds are commercially available.

Alkoxyborane (a)(iii) is a mixture comprising (a)(i) and (a)(ii), each as described above.

Alkoxyborane (a)(iv) is a mixture comprising a monoalkoxyborane having the formula $R^1{}_2BOR^2$ and at least one of (a)(i) and (a)(ii), wherein $R^1$ and $R^2$ are as defined and exemplified above. Examples of monoalkoxyboranes include, but are not limited to, methylphenylmethoxyborane and dimethylmethoxyborane.

The monoalkoxyborane can be a single monoalkoxyborane or a mixture comprising two or more different monoalkoxyboranes, each having the formula $R^1{}_2BOR^2$, wherein $R^1$ and $R^2$ are as defined and exemplified above. Methods of preparing monoalkoxyboranes are well known in the art; many of these compounds are commercially available.

Halosilane (b) is selected from (i) at least one trihalosilane having the formula $R^1SiX_3$, (ii) at least one dihalosilane having the formula $R^1{}_2SiX_2$, (iii) at least one tetrahalosilane having the formula $SiX_4$, (iv) a mixture comprising at least two of (b)(i), (b)(ii), and (b)(iii), and (v) a mixture comprising a monohalosilane having the formula $R^1{}_3SiX$ and at least one of (b)(i), (b)(ii), and (b)(iii), wherein $R^1$ is $C_1$ to $C_{10}$ hydrocarbyl or $C_1$ to $C_{10}$ halogen-substituted hydrocarbyl, and X is —Cl or —Br.

Halosilane (b)(i) is at least one trihalosilane having the formula $R^1SiX_3$, wherein $R^1$ and X are as described and exemplified above. Examples of trihalosilanes include, but are not limited to, silanes having the formulae: $MeSiCl_3$, $EtSiCl_3$, $MeSiBr_3$, $EtSiBr_3$, $PhSiCl_3$, n-$BuSiCl_3$, and i-$PrSiCl_3$, where Me is methyl, Et is ethyl, Ph is phenyl, n-Bu is normal butyl, and i-Pr is isopropyl.

Halosilane (b)(i) can be a single trihalosilane or a mixture comprising two or more different trihalosilanes, each having the formula $R^1SiX_3$ wherein $R^1$ and X are as defined and exemplified above. Methods of preparing trihalosilanes are well known in the art; many of these compounds are commercially available.

Halosilane (b)(ii) is at least one dihalosilane having the formula $R^1{}_2SiX_2$, wherein $R^1$ and X are as defined and exemplified above. Examples of dihalosilanes include, but are not limited to, silanes having the formulae: $Me_2SiCl_2$, $Et_2SiCl_2$, $Me_2SiBr_2$, $Et_2SiBr_2$, $PhMeSiCl_2$, $ViMeSiCl_2$, and $Ph_2SiCl_2$, where Me is methyl, Et is ethyl, Ph is phenyl, and Vi is vinyl.

Halosilane (b)(ii) can be a single dihalosilane or a mixture comprising two or more different dihalosilanes, each having the formula $R^1{}_2SiX_2$, wherein $R^1$ and X are as defined and exemplified above. Methods of preparing dihalosilanes are well known in the art; many of these compounds are commercially available.

Halosilane (b)(iii) is at least one tetrahalosilane having the formula $SiX_4$, wherein X is —Cl or —Br. Examples of tetrahalosilanes include $SiCl_4$ and $SiBr_4$.

Halosilane (b)(iii) can be a single tetrahalosilane or a mixture comprising two or more different tetrahalosilanes, each having the formula $SiX_4$, wherein X is as defined and exemplified above. Methods of preparing tetrahalosilanes are well known in the art; many of these compounds are commercially available.

Halosilane (b)(iv) is a mixture comprising at least two of (b)(i), (b)(ii), and (b)(iii), each as described above.

Halosilane (b)(v) is a mixture comprising a monohalosilane having the formula $R^1{}_3SiX$ and at least one of (b)(i), (b)(ii), and (b)(iii), wherein $R^1$ and X are as defined and exemplified above. Examples of monohalosilanes include, but are not limited to, silanes having the formulae: $ViMe_2SiCl$, $ViPhMeSiCl$, $Me_3SiBr$, $PhMe_2SiCl$, $Vi_2MeSiBr$, and $Ph_2MeSiCl$, wherein Me is methyl, Vi is vinyl, and Ph is phenyl.

The monohalosilane can be a single monohalosilane or a mixture comprising two or more different monohalosilanes, each having the formula $R^1{}_3SiX$, wherein $R^1$ and X are as defined and exemplified above. Methods of preparing monohalosilanes are well known in the art; many of these compounds are commercially available.

The Lewis acid catalyst is at least one Lewis acid catalyst capable of promoting a condensation reaction between the boron-bonded groups —$OR^2$ in the alkoxyborane (a) and the silicon-bonded groups —X in the halosilane (b). Examples of Lewis acid catalysts include, but are not limited to, catalysts having the following formulae: $AlCl_3$, $FeCl_3$, $BCl_3$, and $ZnCl_2$. The Lewis acid catalyst can be a single Lewis acid catalyst or a mixture comprising two or more different Lewis acid catalysts.

The reaction of the alkoxyborane with the halosilane to produce the polyborosiloxane intermediate can be carried out in any standard reactor suitable for contacting, for example, halosilanes with alkoxyboranes. Suitable reactors include glass and Teflon-lined glass reactors. Preferably, the reactor is equipped with a means of agitation, such as stirring. Also, preferably, the reaction is carried out in an inert atmosphere, such as nitrogen or argon, in the absence of moisture.

Alkoxyborane (a) is typically added to a mixture of the halosilane (b) and the Lewis acid catalyst. Reverse addition, i.e., addition of the halosilane to the alkoxyborane in the presence of the Lewis acid catalyst, is also possible. However, reverse addition may lead to a polyborosiloxane having higher polydispersity and, in some cases, may cause gel formation.

The rate of addition of the alkoxyborane (a) to the mixture of the halosilane (b) and the Lewis acid catalyst is typically from 0.1 to 2 mL/min. for a 1000-mL reaction vessel equipped with an efficient means of stirring. When the rate of addition is too slow, the reaction time is unnecessarily prolonged. When the rate of addition is too fast, the reaction mixture may form a gel.

The reaction of the alkoxyborane (a) with the halosilane (b) is typically carried out at a temperature of from 25 to 150° C., alternatively from 30 to 90° C., alternatively from 40 to 80° C. When the temperature is less than 25° C., the rate of the reaction is typically very slow. When the temperature is greater than 150° C., excessive volatilization of the reactants occurs.

The reaction time depends on several factors, including the structures of the alkoxyborane (a) and the halosilane (b), and the temperature. The reaction is typically carried out for an amount of time sufficient to convert at least 95 mol % of the groups —$OR^2$ originally present in the alkoxyborane to —O—Si linkages. For example, the reaction time is typically from 1 to 24 h, alternatively from 1 to 8 h, alternatively from 2 to 5 h, at a temperature of from 40 to 80° C. The optimum reaction time can be determined by routine experimentation using the methods set forth in the Examples section below.

The ratio of the sum of the number of moles of (a)(i) and (a)(ii) to the sum of the number of moles of the alkoxyborane (a) and the halosilane (b) is typically from 0.001 to 0.58, alternatively from 0.01 to 0.4, alternatively from 0.1 to 0.35.

The ratio of the sum of the number of moles of (b)(i), (b)(ii), and (b)(iii) to the sum of the number of moles of the alkoxyborane (a) and the halosilane (b) is typically from 0.42 to 0.999, alternatively from 0.5 to 0.9, alternatively from 0.6 to 0.8.

The ratio of the number of moles of the halosilane (b) to the number of moles of the alkoxyborane (a) is typically from 0.724 to 999, alternatively from 1.2 to 99, alternatively from 1.5 to 9.

The ratio of the number of moles of the group —X in the halosilane (b) to the number of moles of the group —$OR^2$ in the alkoxyborane (a) is typically at least 1.01. For example, the ratio of the number of moles of the group —X in the halosilane (b) to the number of moles of the group —$OR^2$ in the alkoxyborane (a) is typically from 1.01 to 1,000, alternatively from 1.2 to 100, alternatively from 1.5 to 10.

The concentration of the Lewis acid catalyst is sufficient to catalyze the reaction of the alkoxyborane (a) with the halosilane (b). Typically, the concentration of the Lewis acid catalyst is from 0.1 to 3% (w/w), alternatively from 0.5 to 1% (w/w), based on the combined weight of the alkoxyborane and the halosilane.

In step (II) of the method of preparing the polyborosiloxane, the polyborosiloxane intermediate and, optionally, at least one halosilane having the formula $R^1{}_nSiX_{4-n}$, are reacted with water to form a water-insoluble hydrolysis product, wherein $R^1$ and X are as defined above and n=0, 1, 2, or 3, provided when an excess amount of water is used, the method further comprises separating the hydrolysis product from the water.

The optional halosilane of step (II) is at least one halosilane having the formula $R^1{}_nSiX_{4-n}$, wherein $R^1$ and X are as defined and exemplified above, and n is 0, 1, 2, or 3. Thus, the halosilane can be a monohalosilane having the formula $R^1{}_3SiX$, a dihalosilane having the formula $R^1{}_2SiX_2$, a trihalosilane having the formula $R^1SiX_3$, or a tetrahalosilane having the formula $SiX_4$, wherein $R^1$ and X are as defined and exemplified above. Examples of monohalosilanes, dihalosilanes, trihalosilanes, and tetrahalosilanes are as described above for step (I) of the present method. Moreover, the optional halosilane can be a single halosilane or a mixture comprising two or more different halosilanes, each having the formula $R^1{}_nSiX_{4-n}$, wherein $R^1$ and X are as defined and exemplified above.

The polyborosiloxane intermediate and optional halosilane are typically combined with water by adding the intermediate to the water. Reverse addition, i.e., addition of water to the polyborosiloxane intermediate is also possible.

The rate of addition of the polyborosiloxane intermediate and optional halosilane to water is typically from 2 mL/min. to 1,000 mL/min. for a 1000-mL reaction vessel, preferably equipped with an efficient means of stirring. When the rate of addition is too slow, the reaction time is unnecessarily prolonged. When the rate of addition is too fast, the reaction mixture may form a gel.

The reaction of the borosiloxane intermediate with water is typically carried out at a temperature of from 0 to 50° C., alternatively from 0 to 30° C., alternatively from 2 to 10° C. When the temperature is less than 0° C., the rate of the reaction is typically very slow. When the temperature is greater than 50° C., the reaction mixture may form a gel.

The reaction time depends on several factors, including the structure of the polyborosiloxane intermediate and the temperature. The reaction is typically carried out for an amount of time sufficient to effect hydrolysis of the polyborosiloxane intermediate and any optional halosilane. As used herein, the term "hydrolysis" means that at least 95 mol % of the silicon-bonded groups —X originally present in the polyborosiloxane intermediate and any optional halosilane are converted to silicon-bonded hydroxy groups. For example, the reaction time is typically from 15 to 300 min., alternatively from 15 to 100 min., alternatively from 30 to 50 min., at a temperature of from 2 to 10° C. The optimum reaction time can be determined by routine experimentation using the methods set forth in the Examples section below.

The concentration of water in the reaction mixture is typically sufficient to effect hydrolysis of the polyborosiloxane intermediate and any optional halosilane. For example, the concentration of water is typically such that the ratio of the number of moles of water to the sum of the number of moles of the silicon-bonded groups —X in the polyborosiloxane intermediate and the optional halosilane is from 0.5 to 10, alternatively from 1 to 8, alternatively from 4 to 6.

The reaction of the polyborosiloxane intermediate and optional halosilane with water can also be carried out in the presence of an organic solvent. The organic solvent can be any aprotic or dipolar aprotic organic solvent that does not react with the polyborosiloxane intermediate and optional halosilane under the conditions of the present method, and is miscible with the polyborosiloxane intermediate and the hydrolysis product. The organic solvent is typically immiscible with water. As used herein, the term "immiscible" means that the solubility of water in the solvent is less than about 0.1 g/100 g of solvent at 25° C.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene.

The organic solvent can be a single organic solvent or a mixture comprising two or more different organic solvents, each as described and exemplified above.

When present, the concentration of the organic solvent is typically from 1 to 80% (w/w), alternatively from 5 to 60% (w/w), alternatively from 30 to 50% (w/w), based on the total weight of the reaction mixture.

When the polyborosiloxane intermediate and, optionally, the halosilane are reacted with an excess amount of water, the method typically further comprises separating the hydrolysis product from the water before proceeding to step (III), described below. As used herein, the term "excess amount of water" means the concentration of water is such that the ratio of the number of moles of water to the sum of the number of moles of the silicon-bonded group —X in the polyborosiloxane intermediate and the optional halosilane is typically greater than 1, for example, from 1 to 8, alternatively from 4 to 6.

The hydrolysis product can be separated from the water by discontinuing agitation of the mixture, allowing the mixture to separate into two layers, an organic phase and an aqueous phase, and removing the organic phase containing the hydrolysis product. The organic phase is typically washed with water. The water can further comprise a neutral inorganic salt, such as sodium chloride, to minimize formation of an emulsion between the water and organic phase during washing. The concentration of the neutral inorganic salt in the water can be up to saturation. The organic phase can be washed by mixing it with water, allowing the mixture to separate into two layers, and removing the aqueous layer. The organic phase is typically washed from 1 to 5 times with separate portions of water. The volume of water per wash is typically from 0.5 to 2 times the volume of the organic phase. The mixing can be carried out by conventional methods, such as stirring or shaking.

In step (III) of the method of preparing the polyborosiloxane, the hydrolysis product is distilled to remove water of condensation, i.e., water formed by the condensation of silicon-bonded hydroxy groups in the hydrolysis product during heating. The distillation can be carried out at atmospheric or subatmospheric pressure. The distillation is typically carried out at a temperature of from 80 to 150° C., alternatively from 90 to 110° C., at 100 kPa. The distillation is typically continued for an amount of time sufficient to produce a polyborosiloxane having a number-average molecular weight of from 500 to 1000,000. For example, the hydrolysis product is typically heated at a temperature of from 80 to 149° C. for a period of from 0.5 to 24 h, alternatively at a temperature of from 90 to 120° C. for a period of from 1 to 12 h, alternatively at a temperature of from 100 to 115° C. for a period of from 3 to 8 h. When distillation is carried out in the presence of a condensation catalyst, described below, the polyborosiloxane can typically be formed at a lower temperature and/or in less time.

When the polyborosiloxane has a relatively high viscosity, for example, greater than 100 Pa·s at 25° C., the removal of water is facilitated by performing the distillation of the hydrolysis product in the presence of a water-immiscible organic solvent that forms a minimum boiling azeotrope with water. In this case, the distillation can be conveniently carried out using a Dean-Stark trap, which collects water and returns solvent to the distillation vessel.

The hydrolysis product can also be distilled in the presence of a condensation catalyst. The condensation catalyst can be any condensation catalyst typically used to promote condensation of silicon-bonded hydroxy (silanol) groups to form Si—O—Si linkages. Examples of condensation catalysts include, but are not limited to, tin(II) and tin(IV) compounds such as tin dilaurate, tin dioctoate, and tetrabutyl tin; zinc compounds such as zinc octoate; and titanium compounds such as titanium tetrabutoxide. The condensation catalyst can be a single condensation catalyst or a mixture comprising two or more different condensation catalysts.

When present, the concentration of the condensation catalyst is typically from 0.1 to 10% (w/w), alternatively from 0.5 to 5% (w/w), alternatively from 1 to 3% (w/w), based on the combined weight of the alkoxyborane and the halosilane used in step (I) of the method.

The condensation catalyst can be readily removed by filtering the mixture of the polyborosiloxane and condensation catalyst after distillation of the hydrolysis product.

According to one embodiment of the method of preparing the polyborosiloxane, the alkoxyborane (a), the halosilane (b), and the optional halosilane (step II) do not contain phenyl groups.

According to another embodiment of the method, at least 10 mol %, alternatively at least 25 mol %, alternatively at least 50 mol %, of the groups represented by $R^1$ in the alkoxyborane (a), the halosilane (b), and optional halosilane (step II) combined are alkenyl.

Borosiloxane (A)(ii) is at least one borosiloxane compound having the formula $R^1{}_aB(OSiR^1{}_3)_{3-a}$ (II), wherein $R^1$ and a are as defined and exemplified above, provided the borosiloxane compound has an average of at least two alkenyl groups per molecule.

Examples of borosiloxane compounds having the formula (II) include, but are not limited to, $(ViMe_2SiO)_3B$, $(ViMe_2SiO)_2BMe$, $(ViMe_2SiO)_2BPh$, $(ViPhMeSiO)_3B$, $((CH_2=CHCH_2)PhMeSiO)_3B$, and $Vi_2MeSiOBPh_2$, where Me is methyl, Vi is vinyl, Ph is phenyl.

Borosiloxane (A)(ii) can be a single borosiloxane compound or a mixture comprising two or more different borosiloxane compounds, each having the formula (II).

The borosiloxane compound having the formula (II) can be prepared by reacting an alkoxyborane selected from a trialkoxyborane having the formula $B(OR^2)_3$, a dialkoxyborane having the formula $R^1B(OR^2)_2$, a monoalkoxyborane having the formula $R^1{}_2BOR^2$, with a monohalosilane having the formula $R^1{}_3SiX$ in the presence of a Lewis acid catalyst to produce the borosiloxane compound, wherein each $R^1$ is independently $C_1$ to $C_{10}$ hydrocarbyl or $C_1$ to $C_{10}$ halogen-substituted hydrocarbyl, $R^2$ is $C_1$ to $C_8$ alkyl, X is —Cl or —Br, and the ratio of the number of moles of the group —X in the monohalosilane to the number of moles of the group —$OR^2$ in the alkoxyborane is at least 1, provided the borosiloxane compound has an average of at least two alkenyl groups per molecule.

In the preceding method of preparing the borosiloxane compound having the formula (II), the trialkoxyborane, the dialkoxyborane, the monoalkoxyborane, the monohalosilane, and the Lewis acid catalyst are as described and exemplified above in step (I) of the method of preparing the polyborosiloxane having the formula (I).

The reaction for preparing the borosiloxane compound can be carried out in the manner described above in step (I) of the method of preparing the polyborosiloxane, except the ratio of the number of moles of the group —X in the monohalosilane to the number of moles of the group —$OR^2$ in the alkoxyborane is at least 1. For example, the ratio of the number of moles of the group —X in the monohalosilane to the number of moles of the group —$OR^2$ in the alkoxyborane is typically from 1 to 3, alternatively from 1.05 to 2, alternatively from 1.1 to 1.5. Furthermore, the borosiloxane compound can be recovered from the reaction mixture by vacuum distillation.

Borosiloxane (A)(iii) is a mixture comprising (A)(i) and (A)(ii), each as described and exemplified above.

Component (B) is at least one organosilicon compound having an average of at least two silicon-bonded hydrogen atoms per molecule in an amount sufficient to cure the borosiloxane of component (A).

The organosilicon compound has an average of at least two silicon-bonded hydrogen atoms per molecule, alternatively at least three silicon-bonded hydrogen atoms per molecule. It is generally understood that cross-linking occurs when the sum of the average number of alkenyl groups per molecule in component (A) and the average number of silicon-bonded hydrogen atoms per molecule in component (B) is greater than four.

The organosilicon compound can be an organohydrogensilane or an organohydrogensiloxane. The organohydrogensilane can be a monosilane, disilane, trisilane, or polysilane. Similarly, the organohydrogensiloxane can be a disiloxane, trisiloxane, or polysiloxane. The structure of the organosilicon compound can be linear, branched, cyclic, or resinous.

Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded hydrogen atoms can be located at terminal, pendant, or at both terminal and pendant positions.

Examples of organohydrogensilanes include, but are not limited to, diphenylsilane, 2-chloroethylsilane, bis[(p-dimethylsilyl)phenyl]ether, 1,4-dimethyldisilylethane, 1,3,5-tris (dimethylsilyl)benzene, 1,3,5-trimethyl-1,3,5-trisilane, poly (methylsilylene)phenylene, and poly(methylsilylene) methylene.

The organohydrogensilane can also have the formula $HR^1{}_2Si$—$R^3$—$SiR^1{}_2H$, wherein $R^1$ is $C_1$ to $C_{10}$ hydrocarbyl or $C_1$ to $C_{10}$ halogen-substituted hydrocarbyl, both free of aliphatic unsaturation, and $R^3$ is a hydrocarbylene group free of aliphatic unsaturation having a formula selected from:

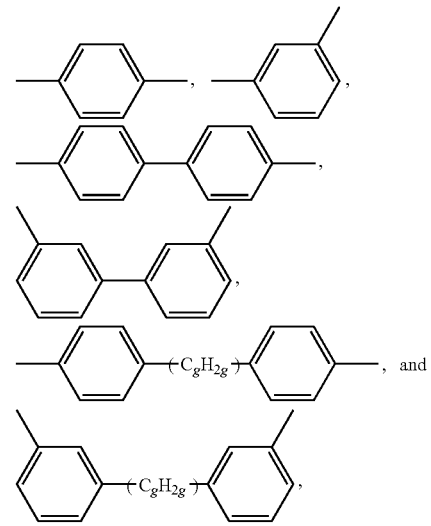

wherein g is from 1 to 6. The hydrocarbyl and halogen-substituted hydrocarbyl groups represented by $R^1$ are as defined and exemplified above for the silicone resin of component (A).

Examples of organohydrogensilanes having the formula $HR^1{}_2Si$—$R^3$—$SiR^1{}_2H$, wherein $R^1$ and $R^3$ are as described and exemplified above include, but are not limited to, silanes having the following formulae:

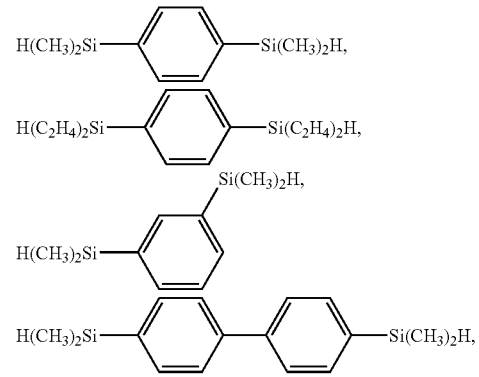

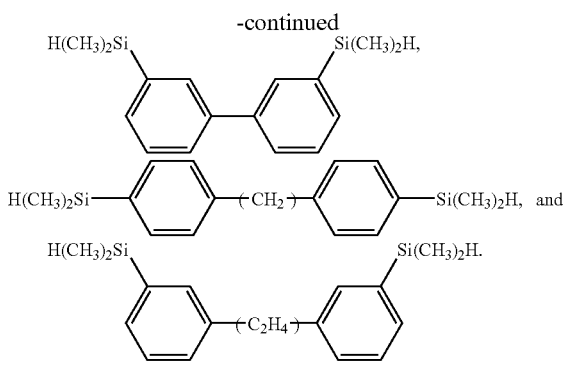

Examples of organohydrogensiloxanes include, but are not limited to, 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), and a resin consisting essentially of $HMe_2SiO_{1/2}$ units, $Me_3SiO_{1/2}$ units, and $SiO_{4/2}$ units, wherein Me is methyl.

Component (B) can be a single organosilicon compound or a mixture comprising two or more different organosilicon compounds, each as described above. For example, component (B) can be a single organohydrogensilane, a mixture of two different organohydrogensilanes, a single organohydrogensiloxane, a mixture of two different organohydrogensiloxanes, or a mixture of an organohydrogensilane and an organohydrogensiloxane.

The concentration of component (B) is sufficient to cure (cross-link) the borosiloxane of component (A). The exact amount of component (B) depends on the desired extent of cure, which generally increases as the ratio of the number of moles of silicon-bonded hydrogen atoms in component (B) to the number of moles of alkenyl groups in component (A) increases. The concentration of component (B) is typically sufficient to provide from 0.5 to 100 moles of silicon-bonded hydrogen atoms, alternatively from 1 to 10 moles of silicon-bonded hydrogen atoms, alternatively from 1.1 to 6 moles of silicon-bonded hydrogen atoms, per mole of alkenyl groups in component (A).

Methods of preparing organosilicon compounds containing silicon-bonded hydrogen atoms are well known in the art. For example, organohydrogensilanes can be prepared by reaction of Grignard reagents with alkyl or aryl halides. In particular, organohydrogensilanes having the formula $HR^1_2Si—R^3—SiR^1_2H$ can be prepared by treating an aryl dihalide having the formula $R^3X_2$ with magnesium in ether to produce the corresponding Grignard reagent and then treating the Grignard reagent with a chlorosilane having the formula $HR^1_2SiCl$, where $R^1$ and $R^3$ are as described and exemplified above.

Methods of preparing organohydrogensiloxanes, such as the hydrolysis and condensation of organohalosilanes, are also well known in the art.

Component (C) of the hydrosilylation-curable silicone composition is at least one hydrosilylation catalyst that promotes the addition reaction of component (A) with component (B). The hydrosilylation catalyst can be any of the well-known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

Preferred hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl-1,1,3,3-tetramethyldisiloxane.

The hydrosilylation catalyst can also be a microencapsulated platinum group metal-containing catalyst comprising a platinum group metal encapsulated in a thermoplastic resin. Compositions containing microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein; and U.S. Pat. No. 5,017,654.

Component (C) can be a single hydrosilylation catalyst or a mixture comprising two or more different catalysts that differ in at least one property, such as structure, form, platinum group metal, complexing ligand, and thermoplastic resin.

The concentration of component (C) is sufficient to catalyze the addition reaction of component (A) with component (B). Typically, the concentration of component (C) is sufficient to provide from 0.1 to 1000 ppm of a platinum group metal, preferably from 1 to 500 ppm of a platinum group metal, and more preferably from 5 to 150 ppm of a platinum group metal, based on the combined weight of components (A) and (B). The rate of cure is very slow below 0.1 ppm of platinum group metal. The use of more than 1000 ppm of platinum group metal results in no appreciable increase in cure rate, and is therefore uneconomical.

The borosiloxane composition can comprise additional ingredients, provided the ingredient does not prevent the borosiloxane of the borosiloxane composition from curing to form the borosiloxane adhesive, described below, of the instant invention. Examples of additional ingredients include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, vinylcyclosiloxanes, and triphenylphosphine; adhesion promoters, such as the adhesion promoters taught in U.S. Pat. Nos. 4,087,585 and 5,194,649; dyes; pigments; anti-oxidants; heat stabilizers; UV stabilizers; flame retardants; flow control additives; fillers, such as reinforcing fillers and extending fillers; and diluents, such as organic solvents and reactive diluents.

The borosiloxane composition typically does not contain an organic solvent. However, the composition may further comprise an organic solvent to reduce viscosity of the composition or facilitate application of the composition on a substrate.

The borosiloxane composition is typically prepared by combining the principal components and any optional ingredients in the stated proportions at ambient temperature, with or without the aid of an organic solvent. Although the order of addition of the various components is not critical if the borosiloxane composition is to be used immediately, the hydrosilylation catalyst is preferably added last at a temperature below about 30° C. to prevent premature curing of the composition.

Mixing can be accomplished by any of the techniques known in the art such as milling, blending, and stirring, either in a batch or continuous process. The particular device is determined by the viscosity of the components and the viscosity of the final borosiloxane composition.

A borosiloxane adhesive according to the present comprises a cured product of a borosiloxane, wherein the borosiloxane is selected from at least one polyborosiloxane having the formula $(R^1_2BO_{1/2})_l[(BO_{(3-v)/2})(OH)_v]_m[(R^1BO_{(2-w)/2})(OH)_w]_n(R^1_3SiO_{1/2})_p[(R^1_2SiO_{(2-x)/2})(OH)_x]_q[(R^1SiO_{(3-y)/2})(OH)_y]_r[(SiO_{(4-z)/2})(OH)_z]_s$ (I), at least one borosiloxane compound having the formula $R^1_aB(OSiR^1_3)_{3-a}$ (II), provided the borosiloxane compound has an average of at least two alkenyl groups per molecule, and a mixture comprising at least one polyborosiloxane having the formula (I), and at least one borosiloxane compound having the formula (II), provided the polyborosiloxane and the borosiloxane compound in the mixture each have an average of at least two alkenyl groups per molecule, wherein each $R^1$ is independently $C_1$ to $C_{10}$ hydrocarbyl or $C_1$ to $C_{10}$ halogen-substituted hydrocarbyl; l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, l+m+n+p+q+r+s≈1, and a is 0, 1, or 2.

The borosiloxane adhesive comprises a cured product of a borosiloxane, wherein the borosiloxane is selected from at least one polyborosiloxane having the formula (I), which may or may not contain alkenyl groups, at least one borosiloxane compound having the formula (II), provided the borosiloxane compound has an average of at least two alkenyl groups per molecule, and a mixture comprising at least one polyborosiloxane having the formula (I), and at least one borosiloxane compound having the formula (II), provided the polyborosiloxane and the borosiloxane compound in the mixture each have an average of at least two alkenyl groups per molecule. The polyborosiloxane and the borosiloxane compound are as described and exemplified above for the borosiloxane composition. As used herein, the term "cured product of a borosiloxane" refers to a cross-linked borosiloxane having a three-dimensional network structure.

The borosiloxane adhesive typically has high transparency. The transparency of the adhesive depends on a number of factors, such as the composition and thickness of the adhesive. For example, a borosiloxane adhesive film having a thickness of 50 μm typically has a % transmittance of at least 80%, alternatively at least 90%, for light in the visible region (~400 to ~700 nm) of the electromagnetic spectrum.

When the borosiloxane adhesive comprises a cured product of a borosiloxane having an average of at least two alkenyl groups per molecule, the adhesive can be prepared by curing the borosiloxane of the borosiloxane composition described above. For example, the borosiloxane can be cured by exposing the borosiloxane composition to a temperature of from 50 to 200° C., alternatively from 80 to 200° C., alternatively from 100 to 150° C., at atmospheric pressure. The borosiloxane composition is generally heated for a length of time sufficient to cure (cross-link) the borosiloxane. For example, the composition is typically heated at a temperature of from 100 to 150° C. for a time of from 0.15 to 1 h.

Alternatively, the borosiloxane adhesive can be prepared by curing the polyborosiloxane having the formula (I) above, whether or not the polyborosiloxane contains alkenyl groups. For example, the polyborosiloxane can be cured by heating the polyborosiloxane at a temperature of from 50 to 300° C., for a period of from 0.5 to 24 h.

The present invention is further directed to a coated substrate, comprising:

a substrate; and a borosiloxane adhesive coating on at least a portion of a surface of the substrate, wherein the adhesive coating comprises a cured product of a borosiloxane, wherein the borosiloxane is selected from at least one polyborosiloxane having the formula $(R^1_2BO_{1/2})_l[(BO_{(3-v)/2})(OH)_v]_m[(R^1BO_{(2-w)/2})(OH)_w]_n(R^1_3SiO_{1/2})_p[(R^1_2SiO_{(2-x)/2})(OH)_x]_q[(R^1SiO_{(3-y)/2})(OH)_y]_r[(SiO_{(4-z)/2})(OH)_z]_s$ (I), at least one borosiloxane compound having the formula $R^1_aB(OSiR^1_3)_{3-a}$ (II), provided the borosiloxane compound has an average of at least two alkenyl groups per molecule, and a mixture comprising at least one polyborosiloxane having the formula (I), and at least one borosiloxane compound having the formula (II), provided the polyborosiloxane and the borosiloxane compound in the mixture each have an average of at least two alkenyl groups per molecule, wherein each $R^1$ is independently $C_1$ to $C_{10}$ hydrocarbyl or $C_1$ to $C_{10}$ halogen-substituted hydrocarbyl; l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, l+m+n+p+q+r+s≈1, and a is 0, 1, or 2.

The substrate can be any rigid or flexible material having a planar, complex, or irregular contour. The substrate can be transparent or nontransparent to light in the visible region (~400 to ~700 nm) of the electromagnetic spectrum. Also, the substrate can be an electrical conductor, semiconductor, or nonconductor. Examples of substrates include, but are not limited to, semiconductors such as silicon, silicon having a surface layer of silicon dioxide, silicon carbide, indium phosphide, and gallium arsenide; quartz; fused quartz; aluminum oxide; ceramics; glass such as soda-lime glass, borosilicate glass, lead-alkali glass, borate glass, silica glass, aluminosilicate glass, lead-borate glass, sodium borosilicate glass, lithium aluminosilicate glass, Chalcogenide glass, phosphate glass, and alkali-barium silicate glass; metal foils; polyolefins such as polyethylene, polypropylene, polystyrene, polyethylene terephthalate (PET), and polyethylene naphthalate; fluorocarbon polymers such as polytetrafluoroethylene and polyvinylfluoride; polyamides such as Nylon; polyimides; polyesters such as poly(methyl methacrylate); epoxy resins; polyethers; polycarbonates; polysulfones; and polyether sulfones.

In addition, the substrate can be a reinforced silicone resin film prepared by impregnating a fiber reinforcement in a curable silicone composition comprising a silicone resin, and heating the impregnated fiber reinforcement to cure the silicone resin. Reinforced silicone resin films prepared from various types of curable silicone compositions are known in the art, as exemplified in the following International Patent Application Publications: WO2006/088645, WO2006088646, WO2007/092032, and WO2007/018756.

The coated substrate comprises a borosiloxane adhesive coating on at least a portion of a surface of the substrate. The borosiloxane adhesive coating may be on a portion of one or more surfaces of the substrate or on all of one or more surfaces. For example, when the substrate is a flat panel, the borosiloxane adhesive coating may be on one side, on both sides, or on both sides and the edges, of the substrate.

The borosiloxane adhesive coating comprises a cured product of a borosiloxane, wherein the cured product is as described and exemplified above for the borosiloxane adhesive of the present invention.

The borosiloxane adhesive coating can be a single layer coating comprising one layer of a borosiloxane adhesive, or a multiple layer coating comprising two or more layers of at least two different borosiloxane adhesives, where directly adjacent layers comprise different cured products (i.e., cured products have a different composition and/or property). The multiple layer coating typically comprises from 2 to 7 layers, alternatively from 2 to 5 layers, alternatively from 2 to 3 layers.

The single layer borosiloxane adhesive coating typically has a thickness of from 0.03 to 300 μm, alternatively from 0.1 to 100 μm, alternatively from 0.1 to 50 μm. The multiple layer coating typically has a thickness of from 0.06 to 300 μm, alternatively from 0.2 to 100 μm, alternatively 0.2 to 50 μm. When the thickness of the borosiloxane adhesive coating is less than 0.03 μm, the coating may become discontinuous. When the thickness of the borosiloxane adhesive coating is greater than 300 μm, the coating may exhibit reduced adhesion and/or cracking.

The coated substrate can be prepared by forming a borosiloxane adhesive coating on a substrate, where the adhesive coating and the substrate are as defined and exemplified above. For example, a coated substrate comprising a single-layer borosiloxane adhesive coating can be prepared by (i) applying a borosiloxane composition, described above, on a substrate to form a film, and (ii) curing the borosiloxane of the film. The borosiloxane composition can be applied on the substrate using conventional methods such as spin coating, dip coating, spray coating, flow coating, screen printing, and roll coating. When present, the solvent is typically allowed to evaporate from the coated substrate before the film is heated. Any suitable means for evaporation may be used such as simple air drying, applying a vacuum, or heating (up to 50° C.).

The borosiloxane of the film can be cured under the conditions described above in the method of preparing the borosiloxane adhesive of the present invention.

The method of preparing the coated substrate, wherein the coating comprises a single layer adhesive coating can further comprise repeating the steps (i) and (ii) to increase the thickness of the coating, except the borosiloxane composition is applied on the cured adhesive film rather than the substrate, and the same borosiloxane composition is used for each application.

A coated substrate comprising a multiple layer borosiloxane adhesive coating can be prepared in a manner similar to the method used to prepare a single layer coating, only adjacent layers of the coating are prepared using a borosiloxane composition having a different composition and typically each film is at least partially cured before applying the borosiloxane composition of the next layer. For example, a coated substrate comprising a borosiloxane adhesive coating having two layers can be prepared by (i) applying a borosiloxane composition, described above, on a substrate to form a first film, (ii) at least partially curing the borosiloxane of the first film, (iii) applying a borosiloxane composition different from the composition in (i), on the partially cured first film to form a second film, and (iv) curing the borosiloxane of the second film.

A laminated substrate according to the present invention comprises:
a first substrate;
at least one additional substrate overlying the first substrate; and
a borosiloxane adhesive coating on at least a portion of at least one surface of each substrate, provided at least a portion of the adhesive coating is between and in direct contact with opposing surfaces of adjacent substrates, wherein the adhesive coating comprises a cured product of a borosiloxane, wherein the borosiloxane is selected from at least one polyborosiloxane having the formula $(R^1_2BO_{1/2})_l[(BO_{(3-v)/2})(OH)_v]_m[(R^1BO_{(2-w)/2})(OH)_w]_n(R^1_3SiO_{1/2})_p[(R^1_2SiO_{(2-x)/2})(OH)_x]_q[(R^1SiO_{(3-y)/2})(OH)_y]_r[(SiO_{(4-z)/2})(OH)_z]_s$ (I), at least one borosiloxane compound having the formula $R^1_aB(OSiR^1_3)_{3-a}$ (II), provided the borosiloxane compound has an average of at least two alkenyl groups per molecule, and a mixture comprising at least one polyborosiloxane having the formula (I), and at least one borosiloxane compound having the formula (II), provided the polyborosiloxane and the borosiloxane compound in the mixture each have an average of at least two alkenyl groups per molecule, wherein each $R^1$ is independently $C_1$ to $C_{10}$ hydrocarbyl or $C_1$ to $C_{10}$ halogen-substituted hydrocarbyl; l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, l+m+n+p+q+r+s≈1, and a is 0, 1, or 2.

As used herein, the term "overlying" used in reference to the additional substrates means each additional substrate occupies a position over, but not in direct contact with, the first substrate and any intervening substrate(s).

The substrates and the borosiloxane adhesive coating of the laminated substrate are as described and exemplified above for the coated substrate of the present invention. The laminated substrate comprises a first substrate and at least one additional substrate. The laminated substrate typically contains from 1 to 20 additional substrates, alternatively from 1 to 10 additional substrates, alternatively from 1 to 4 additional substrates. When the laminated substrate is a laminated glass substrate, at least one of the substrates is glass and, optionally, at least one of the substrates is a reinforced silicone resin film, described above.

The laminated substrate comprises a borosiloxane adhesive coating on at least a portion of at least one surface of each substrate. The adhesive coating may be on a portion of one or more surfaces of each substrate or on all of one or more surfaces of each substrate. For example, when the laminated substrate is a laminated glass comprising glass panes, the borosiloxane adhesive coating may be on one side, on both sides, or on both sides and the edges, of each pane.

As shown in FIG. 1, one embodiment of a laminated substrate according to the present invention comprises a first substrate 100 having a first opposing surface 100A and a second opposing surface 100B; a first borosiloxane adhesive coating 102 on the first opposing surface 100A of the first substrate 100, wherein the first borosiloxane adhesive coating 102 comprises a cured product of a borosiloxane; and a second substrate 104 on the first borosiloxane adhesive coating 102.

Figure 2:
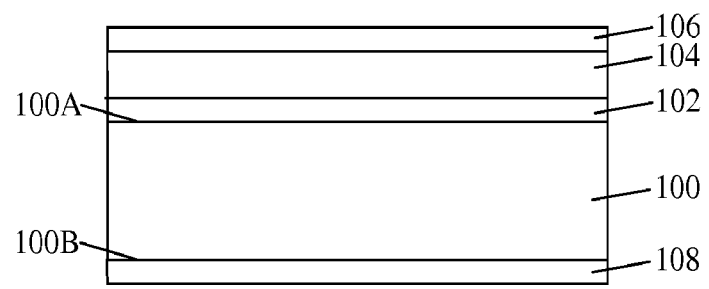
FIG. 2 shows a cross-sectional view of the previous embodiment of the laminated substrate, further comprising a second borosiloxane adhesive coating on the second substrate and a third borosiloxane adhesive coating on the second opposing surface of the first substrate.

As shown in FIG. 2, the preceding embodiment of the laminated substrate can further comprise a second borosiloxane adhesive coating 106 on the second substrate 104 and a third borosiloxane adhesive coating 108 on the second opposing surface 100B of the first substrate 100, wherein the second and third adhesive coatings each comprise a cured product of a borosiloxane.

A suitable method of preparing the laminated substrate is illustrated here for the laminated substrate depicted in FIG. 1. The laminated substrate can be prepared by (i) applying a borosiloxane composition, described above, on a first surface of a substrate to form a first adhesive film; and (ii) applying a second substrate on the first adhesive film; and (iii) curing the borosiloxane of the first adhesive film. Laminated substrates comprising additional borosiloxane adhesive coatings and substrates can be prepared in a similar manner. When the laminated substrate comprises at least one multiple layer borosiloxane adhesive coating, typically each layer of the coating is at least partially cured before the next layer is formed.

The borosiloxane adhesive of the present invention has high resistance to moisture, high transparency, and excellent adhesion to various substrates. Moreover, the borosiloxane adhesive has high adhesion during and after exposure to temperatures above the decomposition temperature of the adhesive, low flammability (as evidenced by low heat release rate), and high char yield.

The borosiloxane adhesive of the present invention is useful in applications requiring adhesives having high moisture resistance, high adhesion at elevated temperatures, low flammability, and high transparency. For example, the borosiloxane adhesive is useful for bonding glass panels in the fabrication of fire rated windows and glass firewalls.

Examples

The following examples are presented to better illustrate the borosiloxane composition and laminated substrate of the present invention, but are not to be considered as limiting the invention, which is delineated in the appended claims. Unless otherwise noted, all parts and percentages reported in the examples are by weight. The following materials were employed in the examples:

Melinex® 516, sold by Dupont Teijin Films (Hopewell, Va.), is a polyethylene-terephthalate (PET) film pretreated on one side with a release agent for slip and having a thickness of 125 μm.

Glass Fabric is a heat-treated glass fabric prepared by heating style 106 electrical glass fabric having a plain weave and a thickness of 37.5 μm at 575° C. for 6 h. The untreated glass fabric was obtained from JPS Glass (Slater, S.C.).

Silicone Base: a mixture containing 82% of a silicone resin having the formula $(PhSiO_{3/2})_{0.75}(ViMe_2SiO_{1/2})_{0.25}$, where the resin has a weight-average molecular weight of about 1700, a number-average molecular weight of about 1440, and contains about 1 mol % of silicon-bonded hydroxy groups; and 18% of 1,4-bis(dimethylsilyl)benzene. The mole ratio of silicon-bonded hydrogen atoms in the 1,4-bis(dimethylsilyl) benzene to silicon-bonded vinyl groups in the silicone resin is 1.1:1, as determined by $^{29}Si$ NMR and $^{13}C$ NMR.

Platinum Catalyst is a mixture containing a platinum(0) complex of 1,3-divinyl-1,1,3,3,-tetramethyldisiloxane in toluene, and having a platinum concentration of 1000 ppm.

Example 1

Iron(III) chloride was dried over a small amount of thionyl chloride overnight. Trimethyl borate was added drop-wise to a stirred mixture of 0.4 g of $FeCl_3$ and 60 g of dimethyldichlorosilane under nitrogen at 50° C. During the addition, volatile products were removed by distillation. After completion of the addition of trimethyl borate, the mixture was stirred at 50° C. for an additional 1 h. Then the temperature was raised to 80° C. and maintained at this temperature for 1 h. Heating was discontinued and the mixture was allowed to cool to room temperature to give a polyborosiloxane intermediate.

Example 2

The polyborosiloxane intermediate of Example 1 (5 g) was combined with 5 g of dimethyldichlorosilane and 10 g of toluene. The mixture was poured into 50 g of de-ionized water and the resulting two-phase mixture was shaken vigorously. Agitation was discontinued and the organic and aqueous phases were allowed to separate. The upper organic phase was collected and washed with 20 g portions of de-ionized water several times. The mixture was transferred to a flask equipped with a Dean-Stark Trap and thermometer and distilled at 89 to 115° C. to remove water. When the volume of water collected remained constant, the mixture was allowed to cool to room temperature to give a polyborosiloxane. A sample of the polyborosiloxane was placed in an aluminum dish and heated in an air-circulating oven at 200° C. for 1 h to give, upon cooling to room temperature, a cured polyborosiloxane was obtained as a transparent solid. After storage under ambient conditions for 4 h, the cured polyborosiloxane remained transparent. After storage overnight, the cured polyborosiloxane became slightly hazy. Further storage did not produce a further change in transparency.

Example 3

The polyborosiloxane intermediate of Example 1 (15 g) was combined with 30 g of dimethyldichlorosilane, 8 g of vinyldimethylchlorosilane, and 40 g of p-xylene. The mixture was poured into 40 g of deionized water and the resulting two-phase mixture was shaken vigorously. Agitation was discontinued and the organic and aqueous phases were allowed to separate. The upper organic phase was collected and washed with 40 g portions of de-ionized water several times, dried over 5 g of magnesium sulfate, and then filtered. The filtrate was treated with 0.2% (w/w) of zinc octoate, based on the theoretical yield of the polyborosiloxane, and the mixture was heated in a flask equipped with a Dean-Stark trap and a thermometer and distilled at 120° C. for 2 hours to remove water. The mixture was allowed to cool to room temperature and then filtered. The filtrate was concentrated under reduced pressure (5 mmHg, 667 Pa) at 80° C. using a rotary evaporator to give a polyborosiloxane as a viscous liquid.

Example 4

The polyborosiloxane of Example 3 (5 g) was combined with 2 g of a poly(methylhydrogen)siloxane having the formula $Me_3SiO(HMeSiO)_nSiMe_3$, where Me is methyl and n has an average value of 67, and 0.035 g of Platinum Catalyst. The mixture was placed in an aluminum dish and heated at 150° C. for 1 h. Upon cooling to room temperature, a cured polyborosiloxane was obtained as a transparent solid.

Example 5

Trimethyl borate (230.8 g), 50 g of chlorodimethylvinylsilane, and 1.4 g of iron(III) chloride, previously dried over thionyl chloride, were combined under nitrogen in a 500-mL three necked flask equipped with a stirrer, condenser, Dean-Stark trap, thermometer, heating mantle, and a temperature controller. The mixture was heated to 50° C., and volatile products were removed by distillation. When the collection of condensed MeCl stopped, the mixture was heated to above 82° C. to remove excess chlorodimethylvinylsilane. When the temperature reached 100° C. and the collection of chlorodimethylvinylsilane ceased, the mixture was cooled to below 40° C. and then treated sequentially with 100 g of toluene and 50 g of cold water. The mixture was stirred for 2 min. and allowed to stand until separation of the aqueous and organic phases was observed. The upper organic phase was recovered and toluene and residual moisture were then removed using rotary evaporator at 80° C. and a final pressure of 2 mmHg, to yield a borosiloxane compound having the formula (ViMe$_2$SiO)$_3$B, where Me is methyl, as a liquid.

The preceding borosiloxane compound (5 g) was combined with 8 g of 1,1,5,5-tetramethyl-3,3-diphenyltrisiloxane, 2 g of fumed silica of fumed silica having a surface area (BET) of 200±25 m$^2$/g, 0.15 g of vinyltrimethoxysilane, and 0.075 g of Platinum Catalyst. The mixture was heated in an air-circulating oven at 150° C. for 1 h. Upon cooling to room temperature, a cured borosiloxane was obtained as a transparent solid. After storage under ambient conditions for three months, the cured borosiloxane became slightly hazy.

Example 6

Silicone Base was mixed with 0.5% (w/w), based on the weight of the Base, of Platinum Catalyst. The resulting composition was applied on the release agent-treated surface of a Melinex® 516 PET film (8 in.×11 in.) to form a silicone film. Glass Fabric having the same dimensions as the PET film was carefully laid down on the silicone film, allowing sufficient time for the composition to thoroughly wet the fabric. The aforementioned silicone composition was then uniformly applied to the embedded fabric. An identical PET film was placed on top of the coating with the release agent-treated side in contact with the silicone composition. The stack was then passed between two stainless steel bars separated by a distance of 300 μm. The laminate was heated in an oven according at 150° C. for 10 min. The oven was turned off and the laminate was allowed to cool to room temperature inside the oven. The upper PET film was separated (peeled away) from the reinforced silicone resin film, and the silicone resin film was then separated from the lower PET film. The transparent reinforced silicone resin film had a thickness of about 125 μm.

Example 7

Two flat float glass plates (6 in.×6 in.×⅛ in.) were washed with a warm solution of detergent in water, thoroughly rinsed with deionized water, and dried in air. Approximately 2 g of the silicone composition of Example 5 was applied on one side of each glass plate. The reinforced silicone resin film of Example 6 having the same dimensions as the glass plates was placed on the coated surface of one of the glass plates, and the coated surface of the other glass plate was then placed on the exposed surface of the reinforced silicone resin film. The laminate was held under vacuum (2500 Pa) at room temperature for 2 h. The composite was heated in an oven at a rate of 3° C./min. to 150° C., at which temperature the laminate was maintained for 2 h. The oven was turned off and the laminated glass was allowed to cool to room temperature inside the oven.

The laminated glass was then placed in an oven and heated at a rate of 3° C./min. to 500° C., held at 500° C. for 0.5 hour, heated at 3° C./min. to 60° C., and then allowed to cool to room temperature. After heat treatment, the glass plates in the laminate remained bonded to the reinforced silicone resin film.

Comparative Example 1

A polyborosiloxane was prepared according to a well-known method in the art (e.g., see U.S. Pat. No. 5,112,779). 1,1,3,3-tetramethyl-1,3-divinyldisiloxane (0.125 mol), 1.5 mol of deionized water, and 0.1 g of trifluoromethanesulfonic acid were combined in a three-neck flask equipped with a thermometer, a condenser, a mechanical stirrer, and a heating mantle. A mixture of 0.25 mol of trimethoxyphenylsilane, 0.25 mol of dimethyldimethoxy-silane, and 0.25 mol of trimethyl borate was added drop-wise to the flask at room temperature with stirring. After completion of the addition, the mixture was heated to 60° C. and kept at this temperature for 1 h. The temperature of the mixture was then increased slowly to allow distillation of the methanol by-product. When the temperature of the mixture reached 85° C., heating was discontinued and the mixture was allowed to cool to room temperature. The mixture was then treated with 1 g of calcium carbonate and stirred for 1 h. The mixture was filtered through filter paper (5 μm pore size). The filtrate was dissolved in toluene and then treated with 0.03% (w/w), based on the theoretical yield of the polyborosiloxane, of potassium hydroxide. The mixture was transferred to a flask equipped with a Dean-Stark Trap and thermometer and distilled at 110° C. to remove water. When the volume of water collected remained constant, the mixture was allowed to cool to room temperature. A sample of the mixture was placed in an aluminum dish and heated in an air-circulating oven at 150° C. for 1 h to give, upon cooling to room temperature, a highly viscous transparent liquid.

The liquid product (50 g) was combined with 8.5 g of 1,1,5,5-tetramethyl-3,3-diphenyltisiloxane and 0.293 g of Platinum Catalyst. The mixture was heated under nitrogen at 150 C for 1 h. Upon cooling to room temperature, a cured polyborosiloxane was obtained as a transparent colorless solid. The solid became white and opaque after storage under ambient conditions for two days.

That which is claimed is:

1. A borosiloxane composition, comprising:
   (A) a borosiloxane selected from (i) at least one polyborosiloxane having the formula $(R^1_2BO_{1/2})_l$ $[(BO_{(3-v)/2})(OH)_v]_m[(R^1BO_{(2-w)/2})(OH)_w]_n(R^1_3SiO_{1/2})_p$ $[(R^1_2SiO_{(2-x)/2})(OH)_x]_q[(R^1SiO_{(3-y)/2})(OH)_y]_r$ $[(SiO_{(4-z)/2})(OH)_z]_s$ (I), (ii) at least one borosiloxane compound having the formula $R^1_aB(OSiR^1_3)_{3-a}$ (II), and (iii) a mixture comprising (A)(i) and (A)(ii), wherein each $R^1$ is independently $C_1$ to $C_{10}$ hydrocarbyl or $C_1$ to $C_{10}$ halogen-substituted hydrocarbyl, l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, l+m+n+p+q+r+s≈1, wherein l, m, n, p, q, r, and s are mole fractions; wherein v, w, x, y, and z are average numbers of hydroxy groups associated with the formula and a is 0, 1, or 2, provided the borosiloxane has an average of at least two alkenyl groups per molecule;
   (B) an organosilicon compound having an average of at least two silicon-bonded hydrogen atoms per molecule to cure the borosiloxane; and
   (C) a hydrosilylation catalyst.

2. The borosiloxane composition according to claim 1, wherein component (A) is (A)(i).

3. The borosiloxane composition according to claim 1, wherein component (A) is (A)(ii).

4. A borosiloxane adhesive comprising a cured product of a borosiloxane, wherein the borosiloxane is selected from at least one polyborosiloxane having the formula $(R^1_2BO_{1/2})_l$ $[(BO_{(3-v)/2})(OH)_v]_m[(R^1BO_{(2-w)/2})(OH)_w]_n(R^1_3SiO_{1/2})_p$ $[(R^1_2SiO_{(2-x)/2})(OH)_x]_q[(R^1SiO_{(3-y)/2})(OH)_y]_r[(SiO_{(4-z)/2})(OH)_z]_s$ (I), at least one borosiloxane compound having the formula $R^1_aB(OSiR^1_3)_{3-a}$ (II), provided the borosiloxane compound has an average of at least two alkenyl groups per molecule, and a mixture comprising at least one polyborosiloxane having the formula (I), and at least one borosiloxane compound having the formula (II), provided the polyborosiloxane and the borosiloxane compound in the mixture each have an average of at least two alkenyl groups per molecule, wherein each $R^1$ is independently $C_1$ to $C_{10}$ hydrocarbyl or $C_1$ to $C_{10}$ halogen-substituted hydrocarbyl; l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, l+m+n+p+q+r+s≈1, wherein l, m, n, p, q, r, and s are mole fractions; wherein v, w, x, y, and z are average numbers of hydroxy groups associated with the formula and a is 0, 1, or 2.

5. The borosiloxane adhesive according to claim 4, wherein the borosiloxane is at least one polyborosiloxane having the formula (I).

6. The borosiloxane adhesive according to claim 4, wherein the borosiloxane is at least one borosiloxane compound having the formula (II), provided the borosiloxane compound has an average of at least two alkenyl groups per molecule.

7. A coated substrate, comprising:
a substrate; and
a borosiloxane adhesive coating on at least a portion of a surface of the substrate, wherein the adhesive coating comprises a cured product of a borosiloxane, wherein the borosiloxane is selected from at least one polyborosiloxane having the formula $(R^1{}_2BO_{1/2})_l[(BO_{(3-v)/2})(OH)_v]_m[(R^1BO_{(2-w)/2})(OH)_w]_n(R^1{}_3SiO_{1/2})_p[(R^1{}_2SiO_{(2-x)/2})(OH)_x]_q[(R^1SiO_{(3-y)/2})(OH)_y]_r[(SiO_{(4-z)/2})(OH)_z]_s$ (I), at least one borosiloxane compound having the formula $R^1{}_aB(OSiR^1{}_3)_{3-a}$ (II), provided the borosiloxane compound has an average of at least two alkenyl groups per molecule, and a mixture comprising at least one polyborosiloxane having the formula (I), and at least one borosiloxane compound having the formula (II), provided the polyborosiloxane and the borosiloxane compound in the mixture each have an average of at least two alkenyl groups per molecule, wherein each $R^1$ is independently $C_1$ to $C_{10}$ hydrocarbyl or $C_1$ to $C_{10}$ halogen-substituted hydrocarbyl; l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, l+m+n+p+q+r+s≈1, wherein l, m, n, p, q, r, and s are mole fractions; wherein v, w, x, y, and z are average numbers of hydroxy groups associated with the formula and a is 0, 1, or 2.

8. The coated substrate according to claim 7, wherein the borosiloxane is at least one polyborosiloxane having the formula (I).

9. The coated substrate according to claim 7, wherein the borosiloxane is at least one borosiloxane compound having the formula (II), provided the borosiloxane compound has an average of at least two alkenyl groups per molecule.

10. The coated substrate according to claim 7, wherein the substrate is selected from glass and a reinforced silicone resin film.

11. A laminated substrate, comprising:
a first substrate;
at least one additional substrate overlying the first substrate; and
a borosiloxane adhesive coating on at least a portion of at least one surface of each substrate, provided at least a portion of the adhesive coating is between and in direct contact with opposing surfaces of adjacent substrates, wherein the adhesive coating comprises a cured product of a borosiloxane, wherein the borosiloxane is selected from at least one polyborosiloxane having the formula $(R^1{}_2BO_{1/2})_l[(BO_{(3-v)/2})(OH)_v]_m[(R^1BO_{(2-w)/2})(OH)_w]_n(R^1{}_3SiO_{1/2})_p[(R^1{}_2SiO_{(2-x)/2})(OH)_x]_q[(R^1SiO_{(3-y)/2})(OH)_y]_r[(SiO_{(4-z)/2})(OH)_z]_s$ (I), at least one borosiloxane compound having the formula $R^1{}_aB(OSiR^1{}_3)_{3-a}$ (II), provided the borosiloxane compound has an average of at least two alkenyl groups per molecule, and a mixture comprising at least one polyborosiloxane having the formula (I), and at least one borosiloxane compound having the formula (II), provided the polyborosiloxane and the borosiloxane compound in the mixture each have an average of at least two alkenyl groups per molecule, wherein each $R^1$ is independently $C_1$ to $C_{10}$ hydrocarbyl or $C_1$ to $C_{10}$ halogen-substituted hydrocarbyl; l is from 0 to 0.2, m is from 0 to 0.5, n is from 0 to 0.6, p is from 0 to 0.7, q is from 0 to 0.9, r is from 0 to 0.999, s is from 0 to 0.5, v is from 0 to 0.05, w is from 0 to 0.05, x is from 0 to 0.45, y is from 0 to 0.63, z is from 0 to 0.25, m+n is from 0.001 to 0.58, q+r+s is from 0.42 to 0.999, (p+2q+3r+4s)/(3m+2n) is from 1.01 to 1000, l+m+n+p+q+r+s≈1, wherein l, m, n, p, q, r, and s are mole fractions; wherein v, w, x, y, and z are average numbers of hydroxy groups associated with the formula and a is 0, 1, or 2.

12. The laminated substrate according to claim 11, wherein the borosiloxane is at least one polyborosiloxane having the formula (I).

13. The laminated substrate according to claim 11, wherein the borosiloxane is at least one borosiloxane compound having the formula (II), provided the borosiloxane compound has an average of at least two alkenyl groups per molecule.

14. The laminated substrate according to claim 11, wherein at least one of the substrates is glass.

15. The laminated substrate according to claim 11, wherein at least one of the substrates is a reinforced silicone resin film.

* * * * *